(12) United States Patent
Corey et al.

(10) Patent No.: US 12,016,747 B2
(45) Date of Patent: Jun. 25, 2024

(54) SYSTEMS AND METHODS FOR MANUFACTURE OF ORTHODONTIC APPLIANCES

(71) Applicant: Braces On Demand Inc., Hicksville, NY (US)

(72) Inventors: Colin James Corey, Carlsbad, CA (US); Ammar Ahmed Syed, Unionville (CA); Thomas Patrick Shannon, Byron Center, MI (US)

(73) Assignee: Braces On Demand, Inc., Hicksville, NY (US)

( * ) Notice: Subject to any disclaimer, the term of this patent is extended or adjusted under 35 U.S.C. 154(b) by 321 days.

(21) Appl. No.: 17/233,073

(22) Filed: Apr. 16, 2021

(65) Prior Publication Data

US 2022/0331066 A1    Oct. 20, 2022

(51) Int. Cl.
| | |
|---|---|
| *A61C 7/14* | (2006.01) |
| *A61C 13/00* | (2006.01) |
| *B33Y 50/02* | (2015.01) |
| *B33Y 80/00* | (2015.01) |

(52) U.S. Cl.
CPC ............ *A61C 7/14* (2013.01); *A61C 13/0019* (2013.01); *B33Y 50/02* (2014.12); *B33Y 80/00* (2014.12)

(58) Field of Classification Search
CPC .... A61C 7/02; A61C 7/08; A61C 7/12; A61C 7/14; A61C 7/141; A61C 7/146; A61C 7/16; A61C 19/02; A61C 2202/00; B33Y 50/02; B33Y 80/00
See application file for complete search history.

(56) References Cited

U.S. PATENT DOCUMENTS

| | | | | |
|---|---|---|---|---|
| 4,014,096 A | * | 3/1977 | Dellinger ............... | A61C 7/12 433/24 |
| 4,183,141 A | * | 1/1980 | Dellinger ............... | A61C 7/146 433/24 |
| 5,055,038 A | * | 10/1991 | Ronay .................... | A61C 7/146 433/24 |

(Continued)

FOREIGN PATENT DOCUMENTS

| | | | | |
|---|---|---|---|---|
| EP | 3170472 | 5/2017 | | |
| FR | 3100975 | 3/2021 | | |
| WO | WO-2008115658 A1 | * | 9/2008 | ......... A61C 13/0004 |

*Primary Examiner* — Edward Moran
*Assistant Examiner* — Matthew P Saunders
(74) *Attorney, Agent, or Firm* — Nixon Peabody LLP

(57) ABSTRACT

In some embodiments, systems, apparatuses, and methods are provided herein useful to orthodontic systems. In some embodiments, an orthodontic system includes a carrier structure including a base, a plurality of groups of support structures, a plurality of orthodontic appliances associated with one of the plurality of groups of support structures, and at least one rail extending from the base, and an assembly structure including a body, a plurality of complementary pieces associated with one of the plurality of orthodontic appliances, at least one channel configured to interface with the at least one rail to allow the assembly structure to be moved from a first position to a second position with respect to the carrier structure, wherein movement of the assembly structure with respect to the carrier structure causes the plurality of complementary pieces to mate with the plurality of orthodontic appliances.

9 Claims, 12 Drawing Sheets

(56) References Cited

U.S. PATENT DOCUMENTS

| | | | | |
|---|---|---|---|---|
| 5,304,061 A | * | 4/1994 | Nelson | A61C 7/146 433/8 |
| 5,542,842 A | * | 8/1996 | Andreiko | A61C 7/00 433/8 |
| 6,123,544 A | * | 9/2000 | Cleary | A61C 7/146 433/74 |
| 2007/0031775 A1 | * | 2/2007 | Andreiko | A61C 7/146 433/24 |
| 2008/0233528 A1 | | 9/2008 | Kim | |
| 2015/0305831 A1 | * | 10/2015 | Cosse | A61C 7/146 433/24 |
| 2020/0405446 A1 | * | 12/2020 | Shannon | B29C 64/40 |
| 2021/0015593 A1 | * | 1/2021 | Shannon | A61C 19/02 |
| 2022/0110721 A1 | * | 4/2022 | Shannon | A61C 7/14 |

* cited by examiner

SYSTEMS AND METHODS FOR MANUFACTURE OF ORTHODONTIC APPLIANCES

TECHNICAL FIELD

This invention relates generally to orthodontics and, more specifically, orthodontic appliances.

BACKGROUND

Orthodontic clinicians seek to correct malocclusions by use of many different devices, such as braces, aligners, expanders, etc. Braces, one of the most commonly used devices, include a number of orthodontic appliances such as brackets, archwires, and ligatures. The brackets are affixed to a patient's teeth and the archwire passes through slots in the brackets designed to receive the archwire. The ligatures secure the archwire within the slots. Additionally, some orthodontic appliances, such as self-ligating brackets, Class II Correctors, etc., comprise multiple pieces or components (i.e., multipiece orthodontic appliances). For example, self-ligating brackets may include a bracket base and a door. These multipiece orthodontic appliances can be assembled by a manufacturer of the orthodontic appliance and/or by a user, such as a clinician. Assembly whether by a manufacturer or clinician, however, poses certain challenges. For example, orthodontic appliances by their nature are quite small and therefore difficult to assemble. Additionally, it is not uncommon for an orthodontic appliance to be damaged and/or broken during assembly and/or handling. Accordingly, a need exists for improved orthodontic systems and methods of assembly for multipiece orthodontic appliances.

BRIEF DESCRIPTION OF THE DRAWINGS

Disclosed herein are embodiments of systems, apparatuses, and methods pertaining orthodontic systems. This description includes drawings, wherein.

Figure 1:
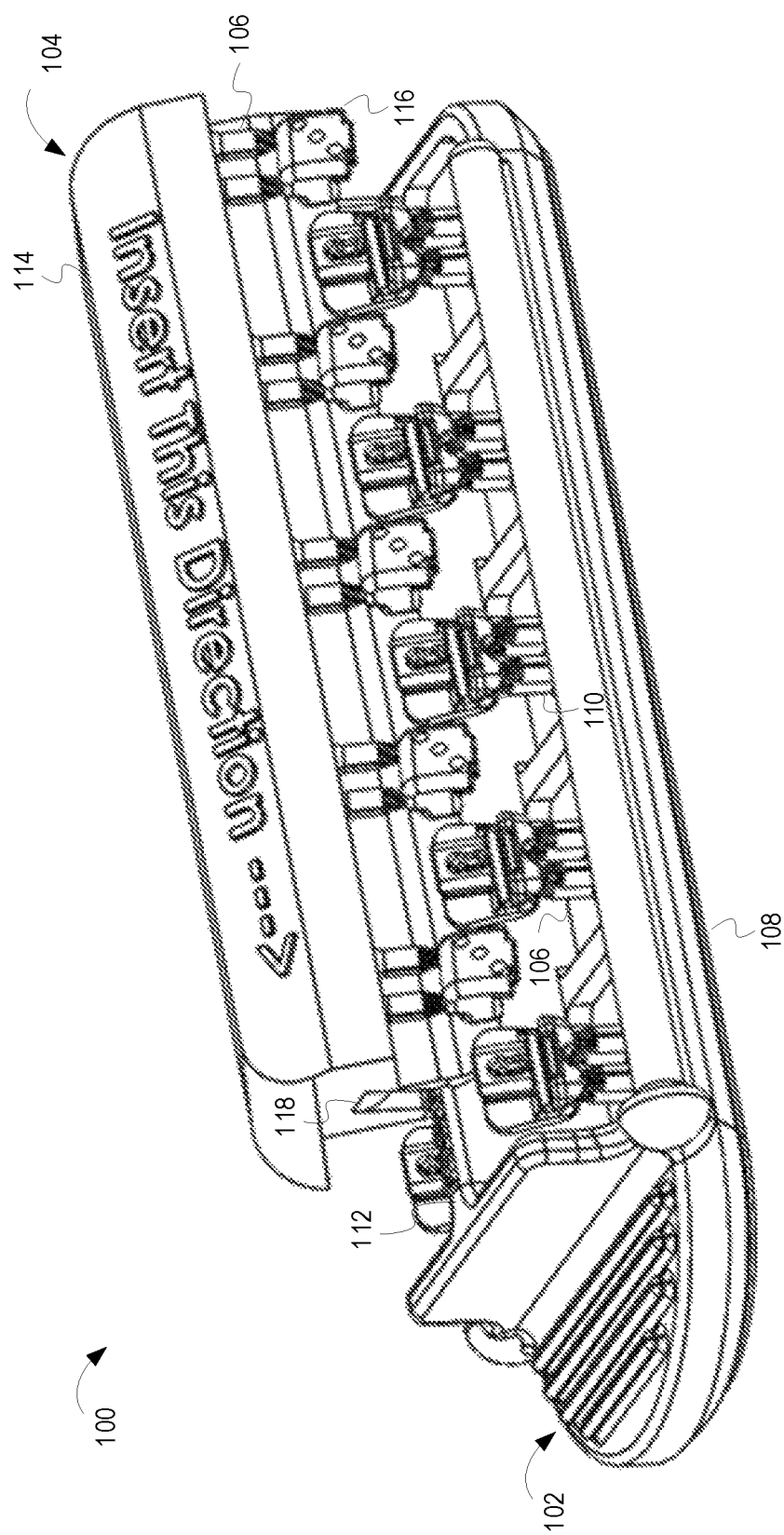
FIG. 1 depicts an orthodontic system 100 including a carrier structure 102 and an assembly structure 104, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to orthodontic systems. In some embodiments, an orthodontic system comprises a carrier structure comprising a base, a plurality of groups of support structures, a plurality of orthodontic appliances, wherein each of the plurality of orthodontic appliances is associated with one of the plurality of groups of support structures, and wherein the plurality of groups of support structures secure the plurality of orthodontic appliances to the base, and at least one rail extending from the base, and an assembly structure comprising a body, a plurality of complementary pieces, wherein each of the complementary pieces is associated with one of the plurality of orthodontic appliances, and wherein the plurality of complementary pieces are secured to the body, at least one channel, wherein the at least one channel is configured to interface with the at least one rail to allow the assembly structure to be moved from a first position to a second position with respect to the carrier structure, wherein movement of the assembly structure with respect to the carrier structure causes the plurality of complementary pieces to mate with the plurality of orthodontic appliances.

As previously discussed, some orthodontic appliances comprise multiple pieces or components (i.e., multipiece orthodontic appliances). For example, self-ligating brackets may include a bracket base and a door. These multipiece orthodontic appliances can be assembled by a manufacturer of the orthodontic appliance and/or by a user, such as a clinician. Assembly whether by a manufacturer or clinician, however, poses certain challenges. For example, orthodontic appliances by their nature are quite small and therefore difficult to assemble. Additionally, it is not uncommon for an orthodontic appliance to be damaged and/or broken during assembly and/or handling.

Described herein are orthodontic appliances, as well as systems, methods, and apparatuses associated with orthodontic appliances, that seek to minimize, if not eliminate, some of these problems. In one embodiment, an orthodontic system comprises a carrier structure and an assembly structure. The carrier structure houses orthodontic appliances (e.g., first pieces of multipiece orthodontic appliances) and the assembly structures houses complementary pieces (e.g., second pieces of multipiece orthodontic appliances). For example, the orthodontic appliances can be bracket bases of self-ligating brackets and the complementary pieces can be doors of the self-ligating brackets. The assembly structure interfaces with the carrier structure such that the assembly structure can be moved with respect to the carrier structure to assemble the multipiece orthodontic appliances. The discussion of FIG. 1 provides an overview of a such an orthodontic system.

FIG. 1 depicts an orthodontic system 100 including a carrier structure 102 and an assembly structure 104, according to some embodiments. The carrier structure 102 includes a carrier base 108, orthodontic appliances 110, and support structures 106. The orthodontic appliances 110 are secured to the base 108 via the support structures 106. The assembly structure 104 includes an assembly base 114, complementary pieces 116, and support structures 106. The complementary pieces 116 are secured to the base 114 via the support structures 106. The complementary pieces 116 mate with the orthodontic appliances 110 to form multipiece orthodontic appliances. Accordingly, each of the complementary pieces 116 is associated with one of the orthodontic appliances 110.

The assembly structure 104 is configured to interface with the carrier structure 102. For example, as depicted in FIG. 1, the assembly structure 104 fits on top of the carrier structure 102. The assembly structure 104 is movable with respect to the carrier structure 102 from a first position to a second position. When the assembly structure 104 is in the second position, the complementary pieces 116 are aligned with the orthodontic appliances 110. That is, each of the complementary pieces 116 is aligned with its associated orthodontic appliance 110. When in the second position, the assembly structure 104 is manipulable with respect to the carrier structure 102 such that the complementary pieces 116 can mate with the orthodontic appliances 110 when the assembly structure 104 is manipulated. The assembly structure 104 can be manipulated with respect to the carrier structure 102 by, for example, moving (e.g., linearly, rotationally, etc.) the assembly structure 104 with respect to the carrier structure 102. When the assembly structure 104 is manipulated to mate the complementary pieces 116 with the orthodontic appliances 110, the complementary pieces 116 are combined with the orthodontic appliances 110 to form multipiece orthodontic appliances.

The orthodontic system 100 depicted in FIG. 1 can be manufactured using any suitable technique and materials. Additionally, each of the components of the orthodontic system 100 need not be manufactured in the same manner or manufactured of the same material. For example, in some embodiments, the carrier structure 102 and the assembly structure 104 can be manufactured of plastic and the orthodontic appliances 110 and complementary pieces 116 can be manufactured of metal. In one embodiment, the orthodontic system 100 is additively manufactured. For example, the carrier structure 102 (i.e., the carrier base 108, the orthodontic appliances 110, and the support structures 106) can be additively manufactured as a single structure and the assembly structure 104 (i.e., the assembly base 114, the complementary pieces 116, and the support structures 106) can be additively manufactured as a single structure. Additional detail regarding the additive manufacture of orthodontic appliances and systems can be found in U.S. patent application Ser. No. 16/875,618 filed May 15, 2020 and titled SYSTEMS AND METHODS FOR MANUFACTURE OF ORTHODONTIC APPLIANCES and U.S. patent application Ser. No. 17/011,121 filed Sep. 3, 2020 and titled SYSTEMS AND METHODS FOR MANUFACTURING ORTHODONTIC DEVICES, both of which are herein incorporated by reference in their entirety. With respect to U.S. patent application Ser. No. 17/011,121, the orthodontic kits can be analogized to the orthodontic systems and/or the carrier structures and assembly structures described herein.

Figure 2A:
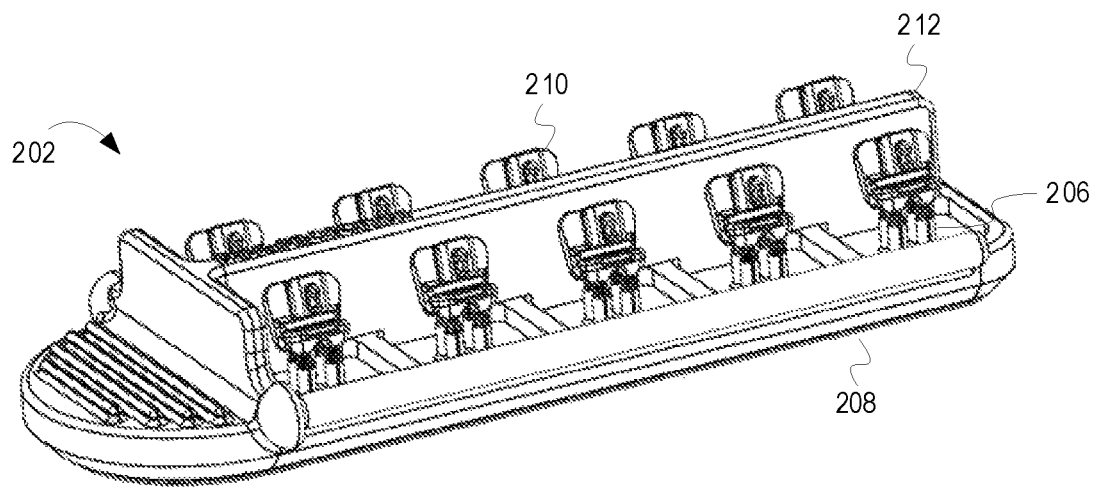
FIG. 2A is a perspective view of a carrier structure 202 of an orthodontic system, according to some embodiments.
Figure 2B:
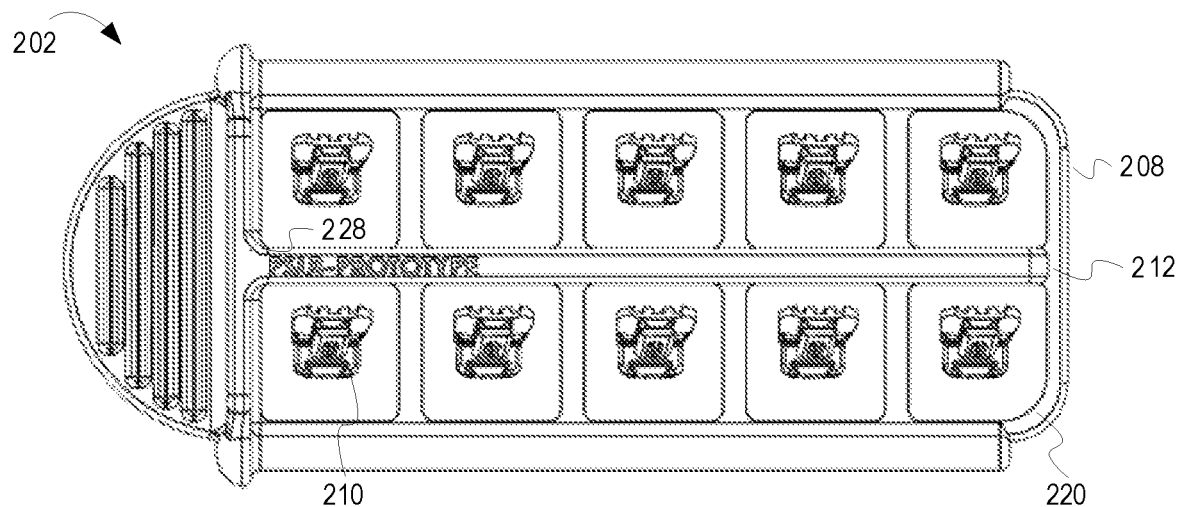
FIG. 2B is a top view of a carrier structure 202 of an orthodontic system, according to some embodiments.
Figure 2C:
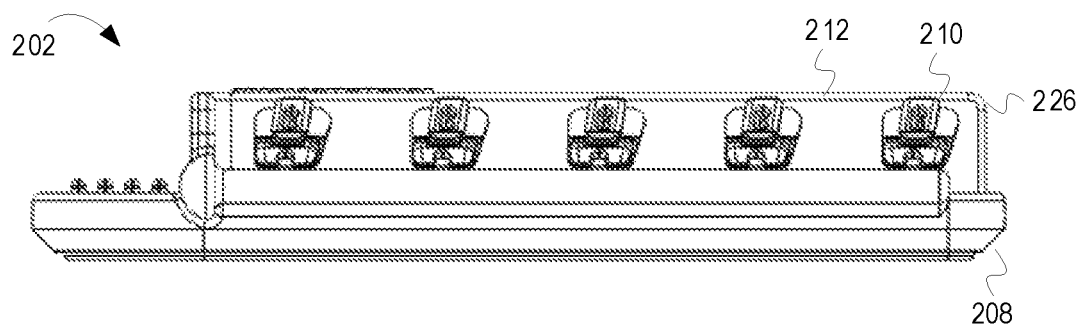
FIG. 2C is a side elevation view of a carrier structure 202 of an orthodontic system, according to some embodiments.

While the discussion of FIG. 1 provides an overview of an orthodontic system including a carrier structure and an assembly structure, the discussion of FIGS. 2A-2C provides additional detail regarding such a carrier structure.

FIGS. 2A-2C are various views of a carrier structure 202 of an orthodontic system, according to some embodiments. In one embodiment, the carrier structure 202 is used in an orthodontic system for assembling multipiece orthodontic appliances. The carrier structure 202 includes a carrier base 208 and orthodontic appliances 210. The orthodontic appliances 210 are secured to the carrier base 208 via support structures 206. In one embodiment, the support structures 206 are arranged in groups. In such embodiments, each of the groups of support structures 206 is associated with one of the orthodontic appliances 210. In some embodiments, the carrier base 208 includes a plurality of wells 220. For example, as depicted in FIGS. 2A-2C, one or more of the orthodontic appliances 210 can be located in each of the wells 220. Additionally, in some embodiments, the wells 220, or other portions of the carrier base 208, can include markings. The markings can, for example, identify the orthodontic appliance(s) 210 located in the wells 220. Additional detail regarding the marking of orthodontic appliances can be found in U.S. patent application Ser. No. 17/011,071 filed Sep. 3, 2020 and titled SYSTEMS AND METHODS FOR MARKING ORTHODONTIC DEVICES and is herein incorporated by reference in its entirety.

The carrier structure 202 includes a rail 212. The rail 212 is configured to interface with a corresponding structure of an assembly structure. Accordingly, the rail 212 can take any suitable form. For example, as depicted in FIGS. 2A-2C, the rail 212 is a positively extruded portion of the carrier base 208. Additionally, though depicted as a single rail 212 in FIGS. 2A-2C, such is not required. For example, the rail 212 may include any number of features, such as multiple positively and/or negatively extruded portions of the carrier base 208.

In some embodiments, the carrier structure 200 includes a number of additional features to aid in interfacing with the assembly structure and/or the assembly of the orthodontic appliances 210 into multipiece orthodontic appliances. As one example, the carrier structure 202 can include a position limit stop 228. The position limit stop 228 can control the movement of the assembly structure with respect to the carrier structure 202. For example, the position limit stop 228 can prevent the assembly structure from being moved too far with respect to the carrier structure 202, secure the assembly structure in a desired location (e.g., a second position in which the orthodontic appliances 210 are aligned with complementary pieces of the assembly structure), prevent the assembly structure from being installed improperly on the carrier structure 202 (e.g., backwards, not fully seated on the rail 212, etc.). As another example, the carrier structure 202 can include a mating structure 226, as described in more detail with respect to FIGS. 7A-7B and 8. The mating structure 226 can be a specially shaped portion of the carrier base 208, such as the rail 212, that complements a mating structure of the assembly structure. For example, the rail 212 can be keyed (i.e., with the mating structure 226) and the assembly structure can include a complementary mating structure. Such a design may help ensure that the correct assembly structure is being installed on the carrier structure 202. For example, the mating mechanism 226 can be associated with a specific assembly structure (e.g., based on a prescription, order number, orthodontic appliance type, etc.).

While the discussion of FIGS. 2A-2C provides additional detail regarding a carrier structure, the discussion of 3A-3B and 4A-4B provides additional detail regarding an assembly structure.

Figure 3A:
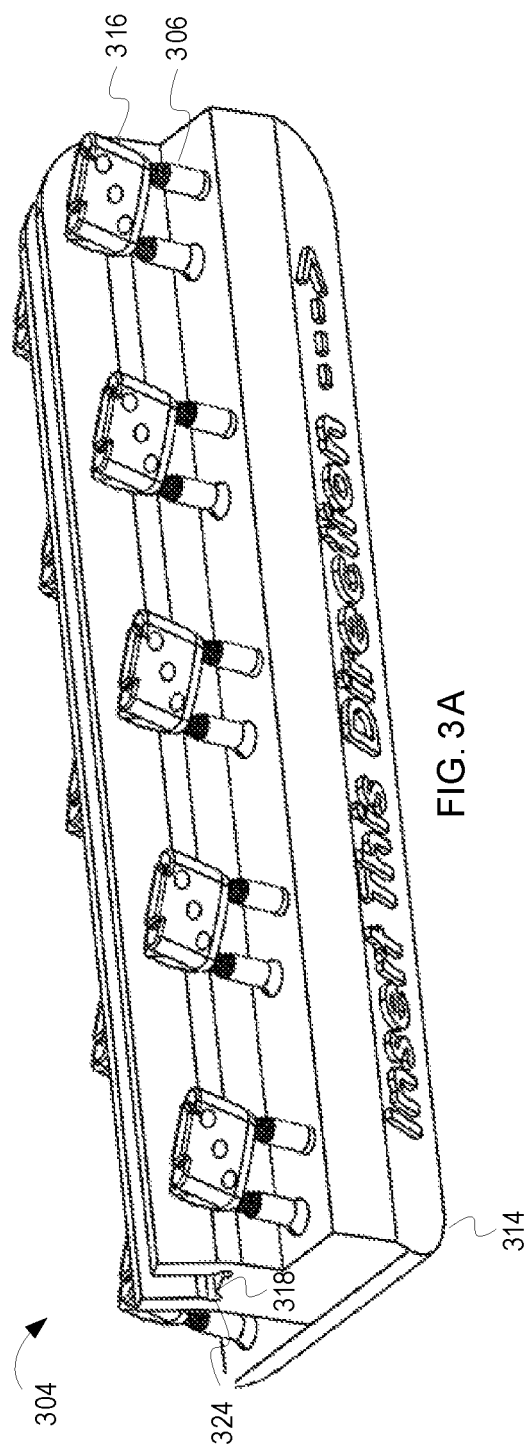
FIG. 3A is a perspective view of an assembly structure 304 of an orthodontic system, according to some embodiments.
Figure 3B:
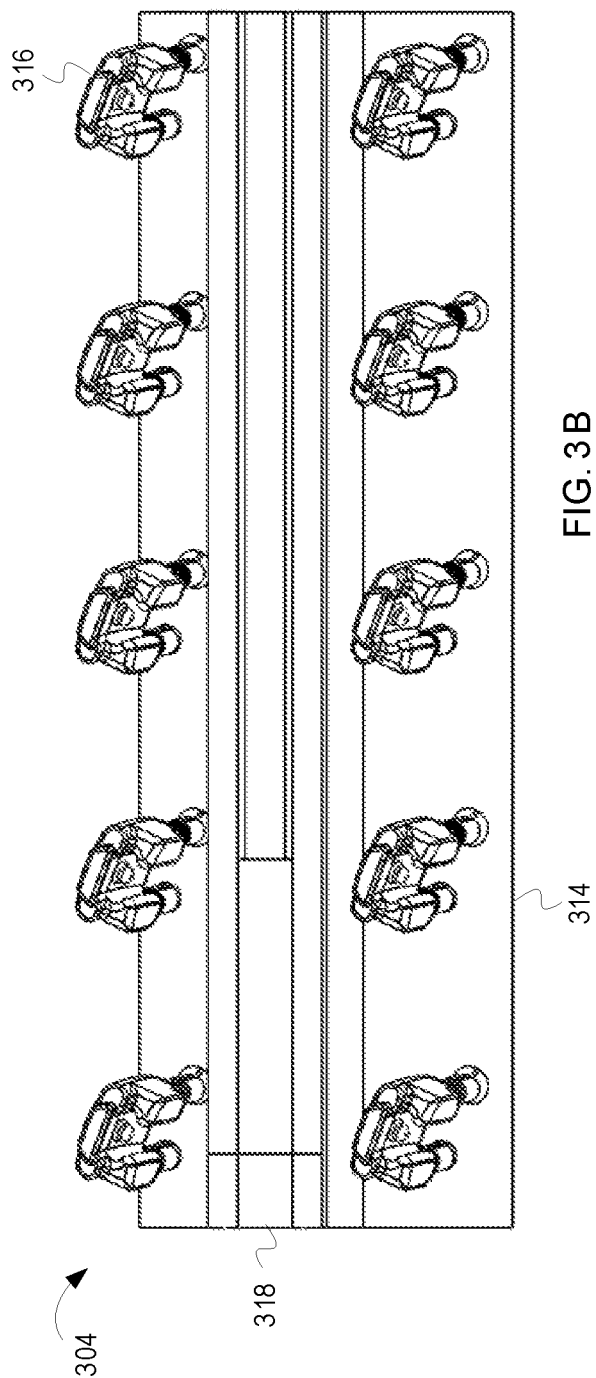
FIG. 3B is a bottom view of an assembly structure 304 of an orthodontic system, according to some embodiments.

FIG. 3A is a perspective view of an assembly structure 304 of an orthodontic system and FIG. 3B is a bottom view of an assembly structure 304 of an orthodontic system, according to some embodiments. The assembly structure 304 is part of an orthodontic system including a carrier structure. The assembly structure 304 includes an assembly base 314 and complementary pieces 316. The complementary pieces 316 are secured to the assembly base 314 via support structures 306. In one embodiment, the support structures 306 are arranged into groups. In such embodiments, each of the groups is associated with one of the complementary pieces 316. The complementary pieces 316 are configured to mate with orthodontic appliances secured to the carrier structure. The complementary pieces 316 mate with the orthodontic appliances to form multipiece orthodontic appliances, such as brackets, Class II Correctors, etc.

The assembly structure 304 includes a channel 318. The channel 318 is configured to interface with the rail of the carrier structure. Accordingly, the channel 318 can take any suitable form. For example, as depicted in FIGS. 3A-3B, the channel 318 is a negatively extruded portion of the assembly base 314. Additionally, though depicted as a single channel 318 in FIGS. 3A-3B, such is not required. For example, the channel 318 may include any number of features, such as negatively and/or positively extruded portions of the assembly base 314.

In some embodiments, the assembly structure 304 includes a number of additional features to aid in interfacing with the carrier structure and/or the assembly of the complementary pieces 316 into multipiece orthodontic appliances. As one example, the assembly structure 314 can include a position limit stop (depicted in, and described with more detail with respect to, FIG. 5). The position limit stop can control the movement of the assembly structure 304 with respect to the carrier structure. For example, the position limit stop can prevent the assembly structure 304 from being moved too far with respect to the carrier structure, secure the assembly structure 304 in a desired location (e.g., a second position in which the orthodontic appliances are aligned with complementary pieces 316 of the assembly structure 304), prevent the assembly structure 304 from being installed improperly on the carrier structure (e.g., backwards, not fully seated on the rail, etc.). As another example, the assembly structure 304 can include a mating structure 324, described in more detail with respect to FIGS. 7A-7B and 8. The mating structure 324 can be a specially shaped portion of the assembly base 314, such as the channel 318, that complements a mating structure of the carrier structure. For example, the channel 318 can be keyed (i.e., with the mating structure 324) and the carrier structure can include a complementary mating structure. Such a design may help ensure that the correct assembly structure 304 is being installed on the carrier structure. For example, the mating mechanism 324 can be associated with a specific carrier structure (e.g., based on a prescription, order number, orthodontic appliance type, etc.).

Figure 4A:
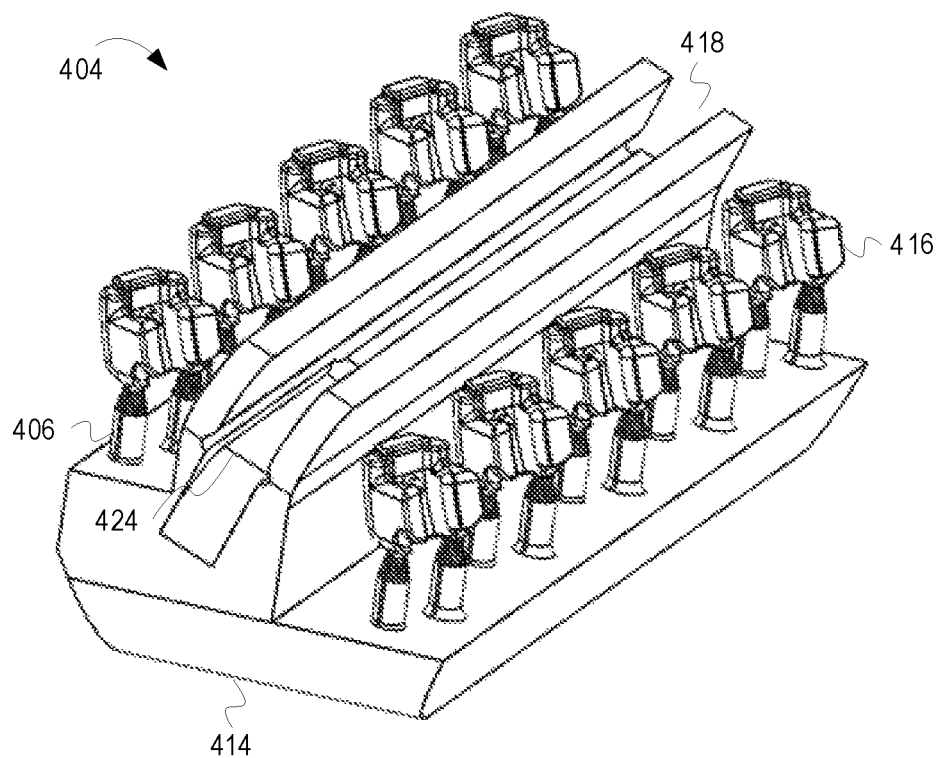
FIG. 4A is a perspective view of an assembly structure 404 of an orthodontic system, according to some embodiments.
Figure 4B:
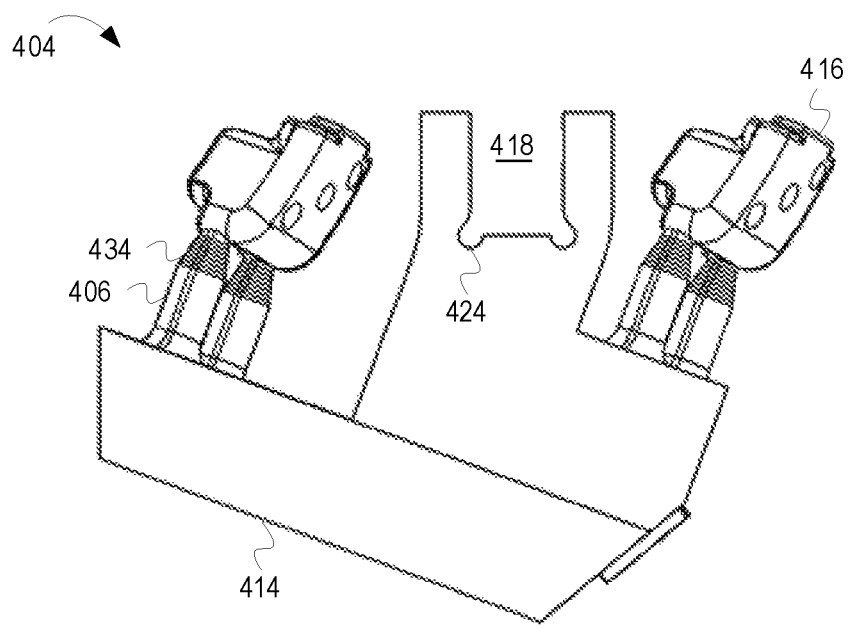
FIG. 4B is a front view of an assembly structure 404 of an orthodontic system, according to some embodiments.

FIGS. 4A and 4B depict additional views of the assembly structure depicted in FIGS. 3A and 3B. Specifically, FIG. 4A is a perspective view of an assembly structure 404 of an orthodontic system and FIG. 4B is a front view of an assembly structure 404 of an orthodontic system, according to some embodiments. As discussed with respect to FIGS. 3A and 3B, the assembly structure 404 includes an assembly base 414 and complementary pieces 416. The complementary pieces 416 are secured to the assembly base 414 via support structures 406. The complementary pieces 416 and the support structures 406 meet at a joint 434. In one embodiment, the support structures 406 are configured to fracture at the joint 434 so that the complementary pieces 416 can be removed from the assembly base 414. The complementary pieces 416 and the assembly base 414 can be separated by physically breaking the joint 434, severing the joint 434 with an instrument such as a knife or scissors, etc. In one embodiment, the joints 434, and thus the support structures 406, are formed in a manner in which the complementary pieces 416 can be easily severed from the support structures 406. As one example, the joints 434 can take a double taper configuration, as shown in FIGS. 4A and 4B. In the double taper configuration, both ends of the joint 434 taper to a section that is, for example, thinner than the rest of the support structure 406 or otherwise includes less material than the rest of the support structure 406. The thinning of the support structure 406 at the joint 434 allows the complementary pieces 416 to be detached from the assembly base 414 by a user physical input (e.g., by hand or with an instrument). The geometry of the joint 434 focuses stress from physical manipulation of the complementary piece 416 and/or assembly base 414 at a desired location within the joint 434. Accordingly, such joint 434 geometry allows for a clean fracture of the material at, or near, the joint 434. Although depicted as a double taper configuration in FIG. 4, the joint 434 can take any suitable form to allow for separation of the complementary pieces 416 from the assembly base 414 at the joint 434. Additionally, in some embodiments, the support structures that secure the orthodontic appliances to the carrier structure can feature similar joints to allow for separation of the orthodontic appliances from the carrier structure.

As discussed with respect to FIGS. 3A and 3B and shown in more detail in FIG. 4B, the assembly structure 404 can include a mating structure 424. For example, and as depicted in FIG. 4B, the mating structure 424 is part of a channel 418. The mating structure 424 of the assembly structure 404 can complement a mating structure of the carrier structure to help ensure that the correct assembly structure 404 is being installed on the carrier structure. For example, the mating mechanism 424 can be associated with a specific carrier structure (e.g., based on a prescription, order number, orthodontic appliance type, etc.).

Figure 5:
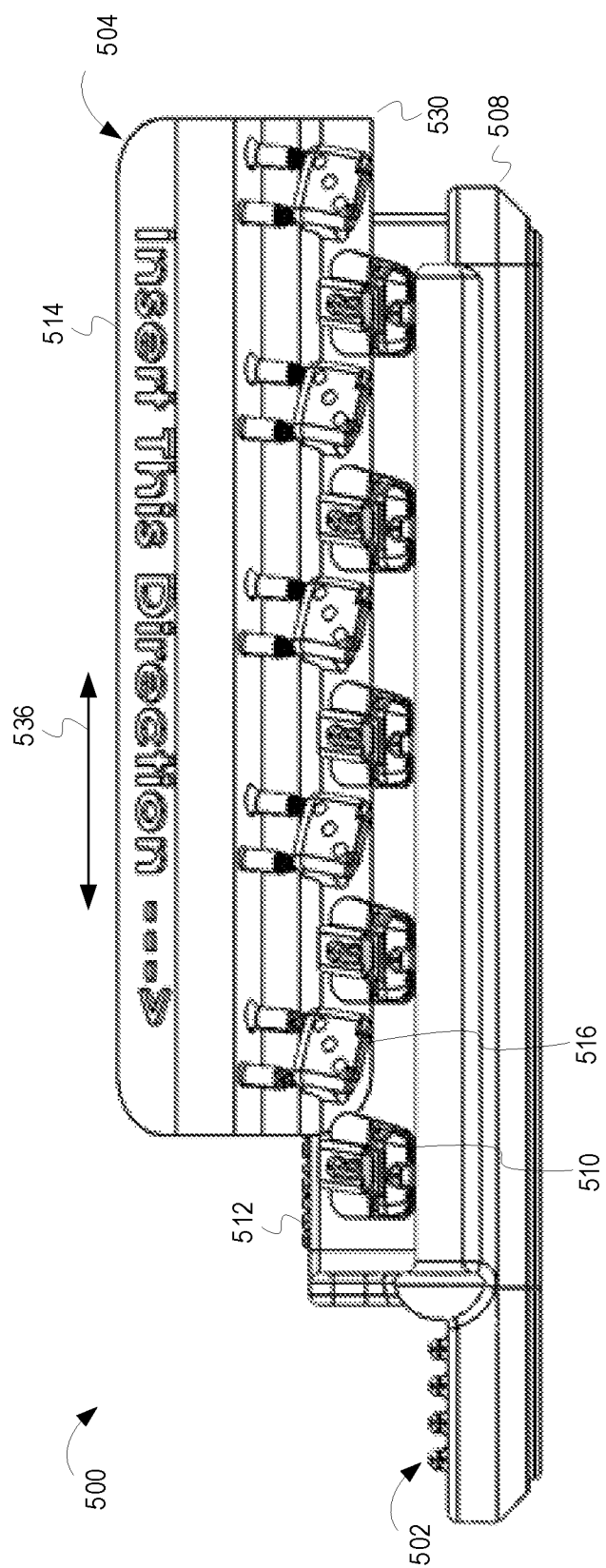
FIG. 5 is a side elevation view of an orthodontic system 500 including a carrier structure 502 and an assembly structure 504, according to some embodiments.

While the discussion of FIGS. 3A-3B and 4A-4B provides additional detail regarding an assembly structure, the discussion of FIG. 5 provides additional detail regarding an orthodontic system including a carrier structure and an assembly structure.

FIG. 5 is a side elevation view of an orthodontic system 500 including a carrier structure 502 and an assembly structure 504, according to some embodiments. The carrier structure 502 includes orthodontic appliances 510 and a carrier base 508. The orthodontic appliances 510 are secured to the carrier structure 502 via support structures. The assembly structure 504 includes complementary pieces 516 and an assembly base 514. The complementary pieces 510 are secured to the assembly base 514 via support structures. The complementary pieces complement (i.e., are associated with) the orthodontic appliances 510. As one example, the orthodontic appliances 510 can form a first part of a multi-piece orthodontic appliance and the complementary pieces 516 can form a second part of the multipiece orthodontic appliance. The complementary pieces 516 mate with the orthodontic appliances 510 to form the multipiece orthodontic appliances.

The assembly structure 504 is configured to interface with the carrier structure 502, as depicted in FIG. 5. For example, in one embodiment, the assembly structure 504 can be placed on the carrier structure 502. The assembly structure 504 is configured to move with respect to the carrier structure 502, as indicated by an arrow 536. For example, a user can place the assembly structure 504 on the carrier structure 502 and slide the assembly structure 504 with respect to the carrier structure 502, as indicated by the arrow 536, to a second position. When the assembly structure 504 is in the second position with respect to the carrier structure 502, the complementary pieces 516 are aligned with their respective orthodontic appliances 510. In one embodiment, the assembly structure 504 includes a position limit stop 530. The position limit stop 530 can, for example, limit the movement of the assembly structure 504 with respect to the carrier structure 502 (e.g., prevent the assembly structure 504 from being moved beyond the second position), secure the assembly structure 504 in the second position, etc. In one embodiment, the assembly structure 504 interfaces with the carrier structure 502 via a channel on the assembly structure 504 and a rail 512 on the carrier structure 502. That is, the channel rides on the rail 512 as the assembly structure 504 is moved with respect to the carrier structure 502.

As previously discussed, when the assembly structure 504 is in the second position, the complementary pieces 516 are aligned with their respective orthodontic appliances 510. When the assembly structure 504 is in the second position, the orthodontic system 500 can be used to assemble the multipiece orthodontic appliances. That is, a user can move the assembly structure 504 with respect to the carrier structure 502 to cause the complementary pieces 516 to mate with their respective orthodontic appliances 510. The user can move (i.e., manipulate) the orthodontic system 500 by, for example, pressing the assembly structure 504 down and/or rotating the assembly structure 504 with respect to the carrier structure 502. Because the complementary pieces 516 are aligned with the orthodontic appliances 510 when the assembly structure 504 is in the second position, such manipulation of the assembly structure 504 causes the complementary pieces 516 to mate with the orthodontic appliances 510. The complementary pieces 516 can mate with the orthodontic appliances by, for example, snapping, clicking, etc. together with no additional input by the user. However, in some embodiments, once the assembly structure 504 has been manipulated, the user may be required to complete one or more additional tasks (e.g., closing clasps or hooks, adding adhesive, severing the complementary pieces 516 from the assembly structure 504, etc.).

Figure 6A:
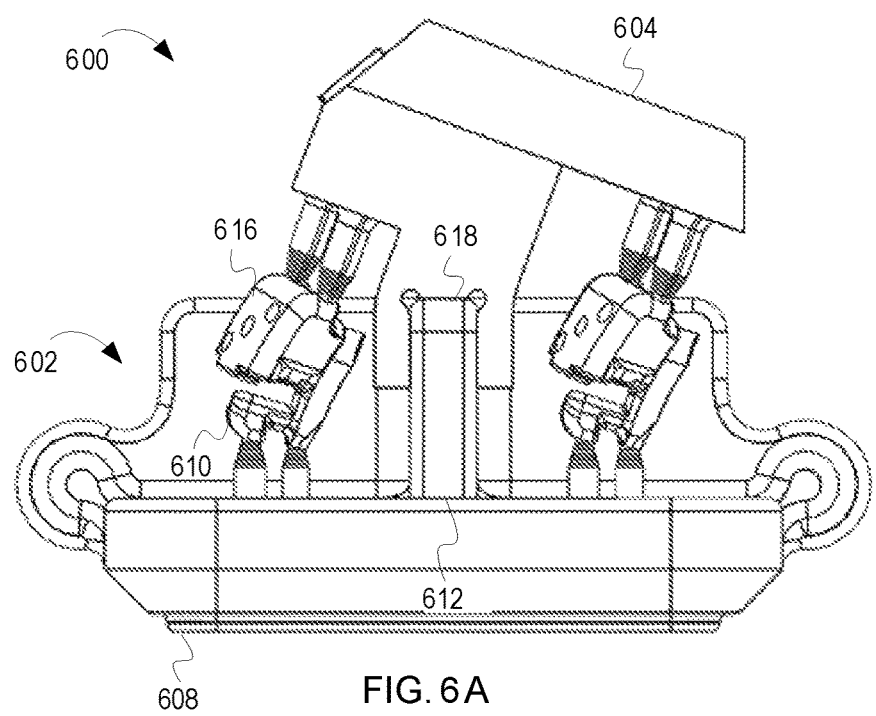
FIG. 6A is a rear view of an orthodontic system 600 including a carrier structure 602 and an assembly structure 604, according to some embodiments.
Figure 6B:
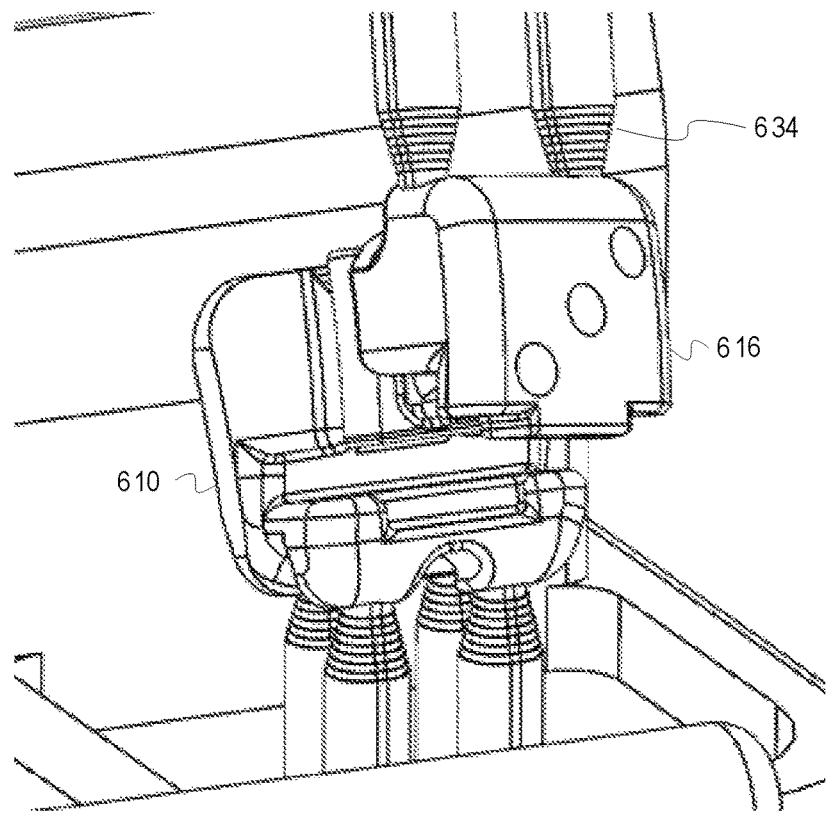
FIG. 6B is an exploded view of an orthodontic appliance 610 and a complementary piece 616, according to some embodiments.

FIGS. 6A and 6B provide additional views of the orthodontic system of FIG. 5. Specifically, FIG. 6A is a rear view of an orthodontic system 600 including a carrier structure 602 and an assembly structure 604 and FIG. 6B is an exploded view of an orthodontic appliance 610 and a complementary piece 616, according to some embodiments. The carrier structure 602 includes a carrier base 608 and orthodontic appliances 610. The orthodontic appliances 610 are secured to the carrier base 608 via support structures 606. The assembly structure 604 includes an assembly base 614 and complementary pieces 616. The complementary pieces 616 are secured to the assembly base 614 via the support structures 606. As depicted in FIGS. 6A and 6B, the support structures featured a tapered configuration leading to joints 634 between the orthodontic appliances 610/complementary pieces 616 and the support structures 606.

The assembly structure 604 is configured to interface with the carrier structure 602. For example, as depicted in FIGS. 6A and 6B, the assembly structure 604 features a channel 618 and the carrier structure 602 features a rail 612. The rail 612 is configured to ride in the channel 618 as the assembly structure 604 is moved with respect to the carrier structure 602. In one embodiment, the assembly structure 604 and the carrier structure 602 can be provided as separate components to be assembled by a user. In such embodiments, the user assembles the orthodontic system 600 by placing the assembly structure 604 on the carrier structure 602. The user can move the assembly structure from a first position, through any range of intermediate positions, to a second position. When the assembly structure 604 is in the second position, the complementary pieces 614 are aligned with their associated orthodontic appliances 610 such that the multipiece orthodontic appliances can be assembled. The multipiece orthodontic appliances are assembled by causing the complementary pieces 616 to mate with their associated orthodontic appliances 610. To facilitate assembly of the multipiece orthodontic appliances, the complementary pieces 616 and the orthodontic appliances 610 including mating features. These mating features allow the complementary pieces 616 to mate with the orthodontic appliances 610. Examples of such mating features can be found in U.S. patent application Ser. No. 17/232,966 filed Apr. 16, 2021 and titled SELF-LIGATING ORTHODONTIC APPLIANCES and is herein incorporated by reference in its entirety. With respect to this disclosure, the orthodontic appliances 610 can be analogized to the main body assemblies and the complementary pieces 616 can be analogized to the body subassemblies of the U.S. Patent Application titled SELF-LIGATING ORTHODONTIC APPLIANCES. Though the U.S. Patent Applicant titled SELF-LIGATING ORTHODONTIC DEVICES specifically describes self-ligating brackets as the multipiece orthodontic appliance, such is not required. That is, techniques similar to those described can be used for a variety of multipiece orthodontic appliances, such as expanders, Class II Correctors, Class III Correctors, passive self-ligating brackets (PSLB), active self-ligating brackets (ASLB), or any other multi-component direct-bonded orthodontic appliance.

Figure 7A:
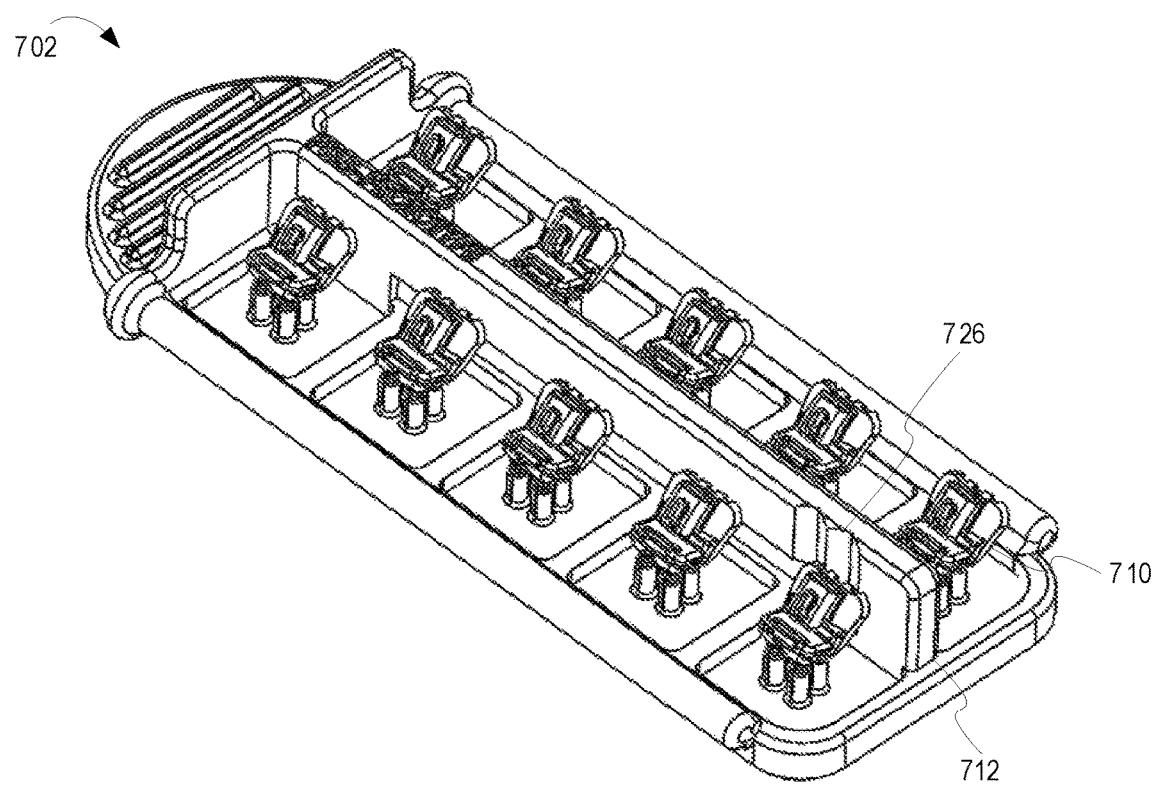
FIG. 7A is a perspective view of a carrier assembly 702 including a first mating structure 726, according to some embodiments.
Figure 7B:
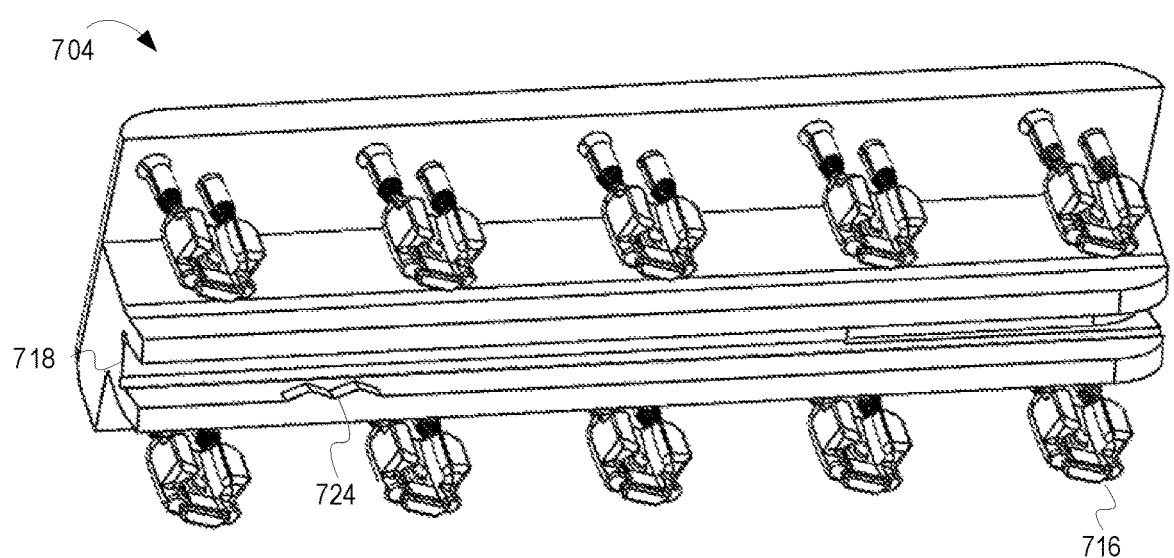
FIG. 7B is a perspective view of an assembly structure 704 including a second mating structure 724, according to some embodiments.
Figure 8:
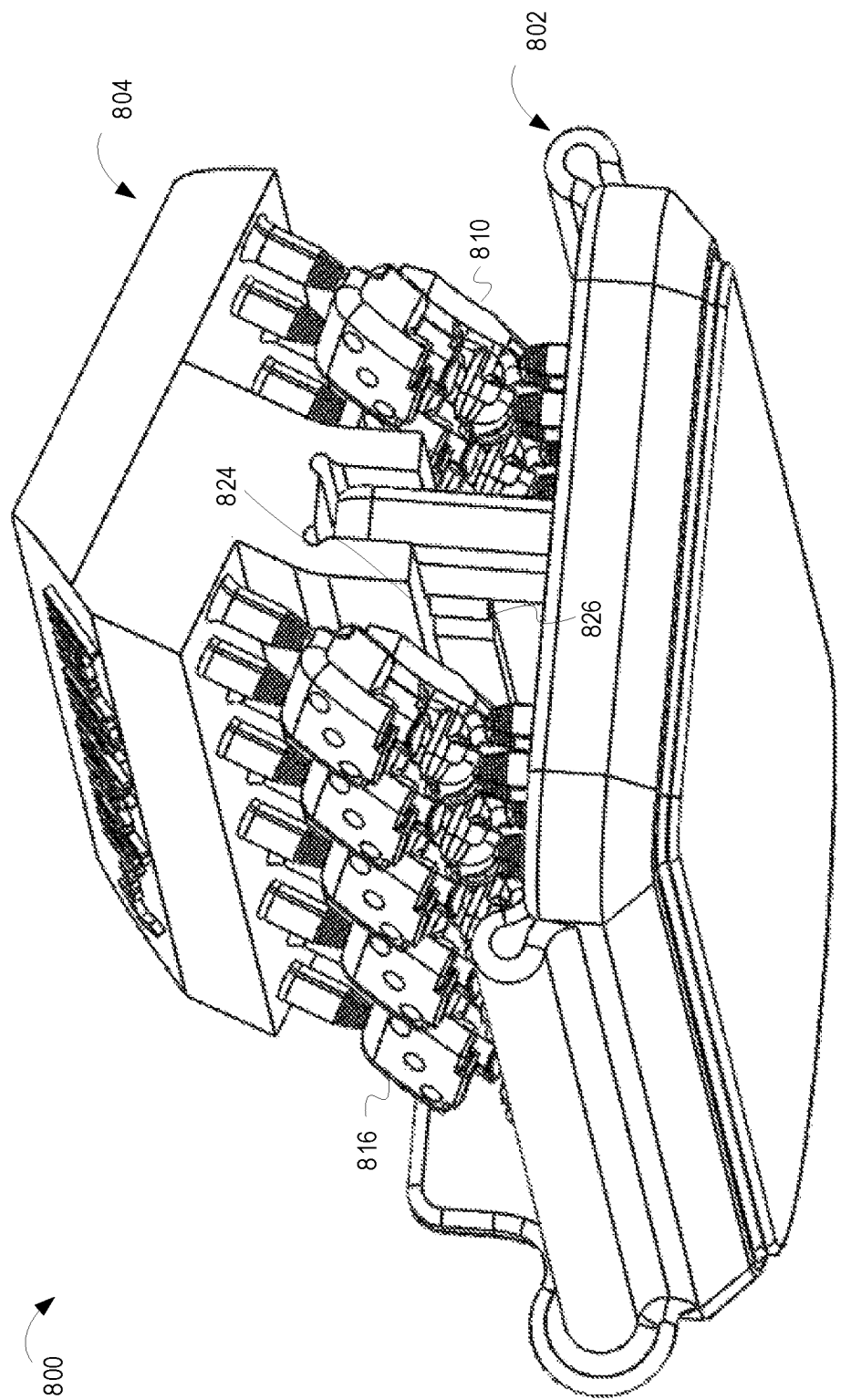
FIG. 8 is a perspective view of an orthodontic system 800, according to some embodiments.

While the discussion of FIGS. 1-6 describes orthodontic systems and devices, the discussion of FIGS. 7A-7B and 8 provide additional information regarding mating structures of a carrier structure and an assembly structure.

FIG. 7A is a perspective view of a carrier assembly 702 including a first mating structure 726 and FIG. 7B is a perspective view of an assembly structure 704 including a second mating structure 724, according to some embodiments. The carrier structure 702 includes orthodontic appliances 710. The assembly structure 704 includes complementary pieces 716. The complementary pieces 716 are configured to mate with the orthodontic appliances 710 to form multipiece orthodontic appliances. The carrier structure 702 and the assembly structure 704 a part of an orthodontic system (depicted in FIG. 8) for assembling the multipiece orthodontic appliances.

The carrier structure 702 features a rail 712. The assembly structure 704 features a channel 718. The assembly structure 704 is configured to interface with the carrier structure 704 via the channel 718 and the rail 712. For example, the channel 718 of the assembly structure 704 can seat on the rail 712 of the carrier structure 702. The rail 712 of the carrier structure 702 rides within the channel 718 of the assembly structure 704 in use. In some embodiments, an example of which is depicted in FIGS. 7A and 7B, the rail 712 and/or channel 718 can include mating structures. In one embodiment, the mating structure(s) act as keys to help ensure that the correct assembly structure 704 is used with the carrier structure 702. For example, the complementary pieces 716 of the assembly structure 704 can be specific to the orthodontic appliances 710 of the carrier structure 702. In such embodiments, the mating structure(s) can be unique to the complementary pieces 716 and/or the orthodontic appliances 710 to decrease the likelihood that a user attempts to mate the complementary pieces 716 with the incorrect orthodontic appliances 710. One example of such matin structures is depicted in FIGS. 7A and 7B.

In FIGS. 7A and 7B, the carrier structure 702 includes the first mating structure 726 and the assembly structure 704 includes a second mating structure 724. Specifically, in the example depicted in FIGS. 7A and 7B, the first mating structure 726 is located on the rail 712 and the second mating structure 724 is located in the channel 728. The first mating structure 726 and the second mating structure 724 complement each other such that it is more difficult, if not impossible, to place an assembly structure 704 on a carrier structure 702 in which the mating structures do not complement one another. In this manner, the mating structures can act as a keying mechanism. Though the first mating structure 726 and the second mating structure 724 depicted in the example provided in FIGS. 7A and 7B are relatively simply geometric structures, such is not required. For example, the first mating structure 726 and the second mating structure 724 can take any suitable form to provide complementary keying structures.

While FIGS. 7A and 7B depict a carrier structure and an assembly structure independently, FIG. 8 depicts the carrier structure and the assembly structure combined as an orthodontic system.

FIG. 8 is a perspective view of an orthodontic system 800, according to some embodiments. The orthodontic system 800 includes a carrier structure 802 and an assembly structure 804. The carrier structure 802 includes orthodontic appliances 810 and the assembly structure 804 includes complementary pieces 816. The complementary pieces 816 combine with the orthodontic appliances 810 to form multipiece orthodontic appliances. The orthodontic system 800 can be used to assemble the multipiece orthodontic appliances.

As discussed with respect to FIGS. 7A and 7B, the carrier structure 802 includes a first mating structure 826 and the assembly structure 804 includes a second mating structure 824. As shown in FIG. 8, the first mating structure 826 and the second mating structure 824 interact when the assembly structure 804 is placed on the carrier structure 802.

Figure 9:
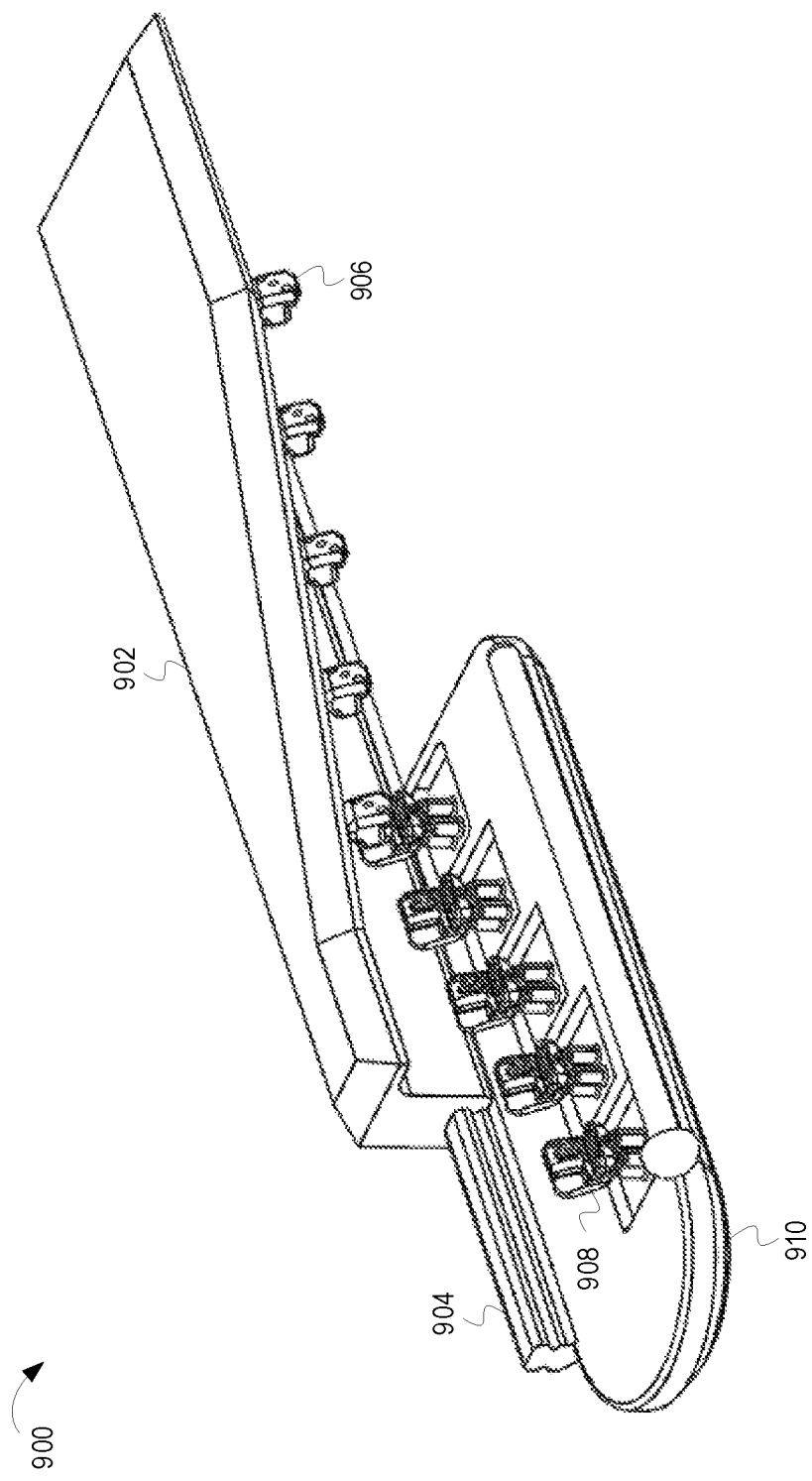
FIG. 9 is a perspective view of an orthodontic system 900, according to some embodiments.

While the discussion of FIGS. 1-8 describes a first embodiment of orthodontic systems and devices in which a number of complementary pieces mate with a number of orthodontic appliances substantially in parallel, the discussion of FIGS. 9-10 describes a second embodiment of orthodontic systems and devices in which a number of complementary pieces mate with a number of orthodontic appliances in series.

FIG. 9 is a perspective view of an orthodontic system 900, according to some embodiments. The orthodontic system 900 includes a carrier structure 910 and an assembly structure 902. The carrier structure 910 includes a carrier base, orthodontic appliances 908, and support structures. The orthodontic appliances 908 are secured to the carrier structure 910 via the support structures. The assembly structure 902 includes an assembly base, complementary pieces 906, and support structures. The complementary pieces 906 are secured to the assembly structure 902 via the support structures. The complementary pieces 906 mate with the orthodontic appliances 908 to form multipiece orthodontic appliances. Accordingly, each of the complementary pieces 906 is associated with one of the orthodontic appliances 908.

The carrier structure 910 includes a rail 904. The assembly structure 902 is configured to interface with the carrier structure 910 via the rail 904. The assembly structure 902 is movable with respect to the carrier structure 910 from a first position to a second position. Movement of the assembly structure 902 with respect to the carrier structure 910 causes the complementary pieces 906 to mate with the orthodontic appliances 908. In the example depicted in FIG. 9, the complementary pieces 906 mate with the orthodontic appliances 908 in series (i.e., one after the other) as the assembly structure 902 is moved from the first position to the second position.

Figure 10A:
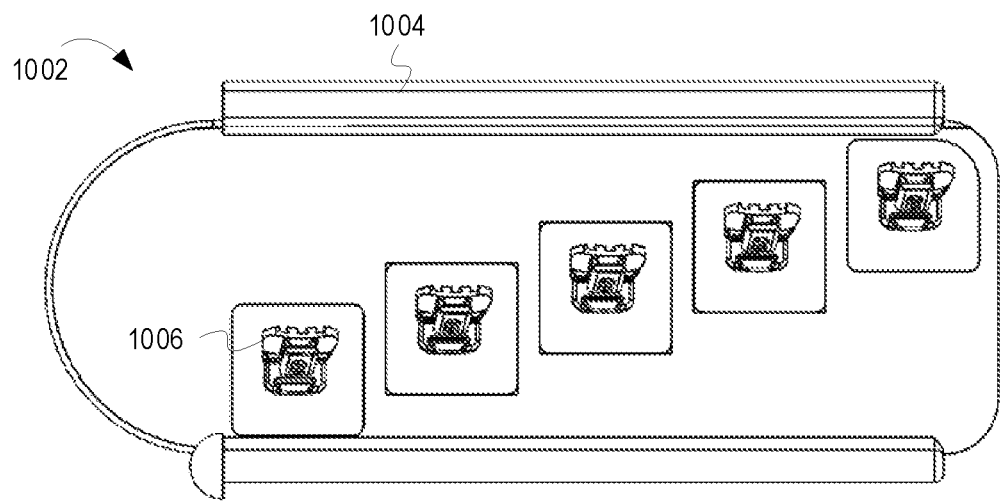
FIG. 10A is top elevation view of a carrier structure 1002, according to some embodiments.
Figure 10B:
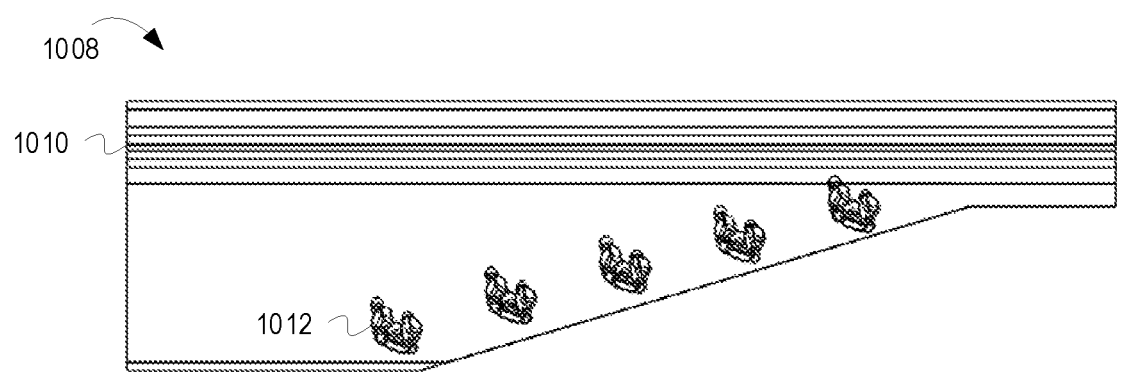
FIG. 10B is a bottom elevation view of an assembly structure 1008, according to some embodiments.

FIG. 10A is top elevation view of a carrier structure 1002 and FIG. 10B is a bottom elevation view of an assembly structure 1008, according to some embodiments. The carrier structure 1002 houses orthodontic appliances 1006. The assembly structure 1008 houses complementary pieces 1012. The complementary pieces 1012 mate with the orthodontic appliances 1006 to form multipiece orthodontic appliances. The assembly structure 1008 is configured to interface with the carrier structure 1002. For example, as depicted in FIGS. 10A and 10B, the carrier structure 1002 includes a rail 1004 and the assembly structure 1008 includes a channel 1010. The rail 1004 rides in the channel 1010 to allow movement of the assembly structure 1008 with respect to the carrier structure 1002 from a first position to a second position. In one embodiment, the complementary pieces 1012 mate with the orthodontic appliances 1006 in series (i.e., one after the other) as the assembly structure 1010 is moved from the first position to the second position.

Figure 11:
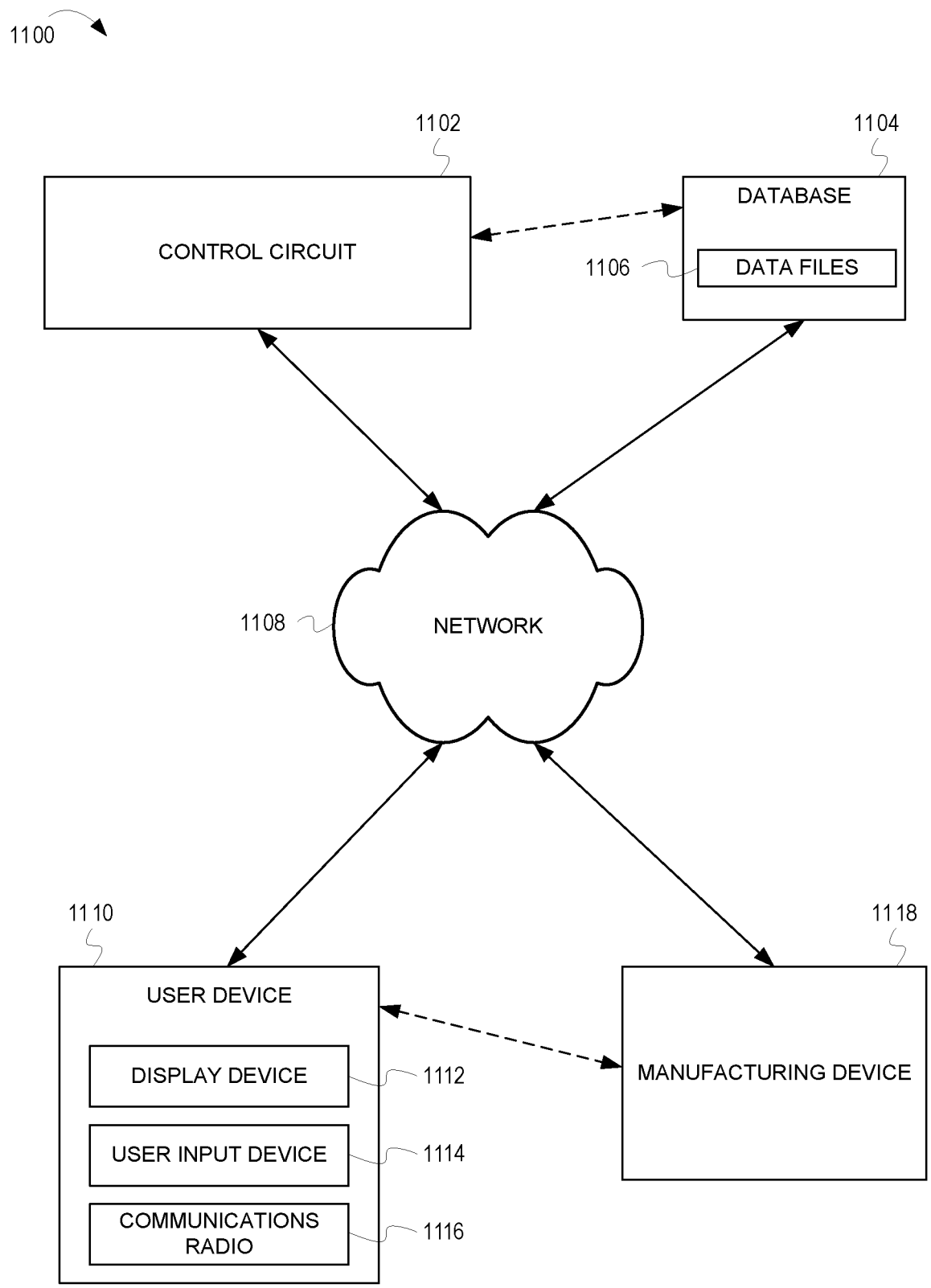
FIG. 11 is a block diagram of a system 1100 for additively manufacturing multipiece orthodontic appliances, according to some embodiments.

While the discussion of FIGS. 1-10 describes orthodontic systems and devices, the discussion of FIG. 11 provides additional detail regarding the manufacture of such orthodontic systems and devices.

FIG. 11 is a block diagram of a system 1100 for additively manufacturing multipiece orthodontic appliances, according to some embodiments. The system 1100 includes a control circuit 1102, a database 1104, a user device 1110, and a manufacturing device 1118. One or more of the control circuit 1102, the database 1104, the user device 1110, and the manufacturing device 1118 are communicatively coupled via a network 1108. The network 1108 can include a local area network (LAN) and/or wide area network (WAN), such as the internet. Accordingly, the network 1108 can include wired and/or wireless links.

The user device 1110 can be any suitable type of computing device (e.g., a desktop or laptop computer, smartphone, tablet, etc.). The user device 1110 includes a display device 1112. The display device 1112 is configured to present a catalogue to a user. The catalogue includes orthodontic appliances that the user can obtain via the system 1100, such as the multipiece orthodontic appliances described herein. For example, the catalogue can include all orthodontic devices that the user can purchase and/or manufacture via the manufacturing device 1118. The user interacts with the catalogue via a user input device 1114. The user can interact with the catalogue by navigating the catalogue, making selections from the catalogue, modifying orthodontic appliances included in the catalogue, etc. Accordingly, the user input device 1114 can be of any suitable type, such as a mouse, keyboard, trackpad, touchscreen, etc. The user device 1110 also includes a communications radio 1116. The communications radio 1116 transmits and receives information for the user device 1110. For example, in the case of a smartphone, the communications radio 1116 can be a cellular radio operating in accordance with the 4G LTE standard. Once a user has made a selection of an orthodontic appliance, the user device 1110, via the communications radio 1116 and the network 1108, transmits an indication of the selection to the control circuit 1102.

The control circuit 1102 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 902 is configured (for example, by using corresponding programming as will be well understood by those skilled in the art) to carry out one or more of the steps, actions, and/or functions described herein.

By one optional approach the control circuit 1102 operably couples to a memory. The memory may be integral to the control circuit 1102 or can be physically discrete (in whole or in part) from the control circuit 1102 as desired. This memory can also be local with respect to the control circuit 1102 (where, for example, both share a common circuit board, chassis, power supply, and/or housing) or can be partially or wholly remote with respect to the control circuit 1102 (where, for example, the memory is physically located in another facility, metropolitan area, or even country as compared to the control circuit 1102).

This memory can serve, for example, to non-transitorily store the computer instructions that, when executed by the control circuit 1102, cause the control circuit 1102 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit may be remote from the user device 1110 and/or the manufacturing device 1118. For example, the user device 1110 and the manufacturing device 1118 may be located in a clinician's office (e.g., the user's office) whereas the control circuit 1102, and possibly the database 1104, are cloud-based. The control circuit 1102 generally operates to retrieve data files 1106 based on the user's selection of orthodontic appliances. The control circuit 1102 retrieves the data files 1106 from the database 1104. The database 904 is configured to store the data files 1106. The data files 1106 are associated with orthodontic appliances and, in some embodiments, orthodontic systems including carrier structures and assembly structures. The data files 1106 are CAD files from which the orthodontic devices, and in some embodiments the orthodontic systems, can be manufactured. The database 1104 stores a data file for each of the orthodontic appliances included in the catalogue and/or each of the orthodontic systems included in the catalogue. In one embodiment, the database 1104 stores a data file for all possible permutations of each orthodontic appliance (e.g., every possible modification and/or combination or modifications for each orthodontic appliance). The control circuit 1102 receives the indication of the orthodontic appliance and/or system and retrieves a data file based on the indication of the orthodontic appliance and/or system.

It should be noted that the indication of the orthodontic appliance may include more than one orthodontic appliance. For example, the indication of the orthodontic appliance can include multiple orthodontic appliances, such as full set of brackets for a patient or an orthodontic system including a carrier structure and an assembly structure. Accordingly, the data file can be a file including instructions and/or specifications for multiple orthodontic appliances as well as structures in addition to the orthodontic appliances. For example, the data file may include multiple data files and/or multiple specifications for a number of brackets.

After retrieving the data file, the control circuit 1102 transmits the data file. In some embodiments, the control circuit 1102 encrypts or otherwise protects the data file before transmission. The control circuit 1102 can encrypt or otherwise protect the data file before transmission to prevent those other than the user from accessing the data file. Additionally, in some embodiments, the control circuit 1102 can encrypt or otherwise protect the data file to control the user's access to the data file. For example, in some embodiments, the system is set up such that user's pay on a per manufacture or per print basis. That is, the user does not purchase, and may not later have access to, the data file. Rather, the user purchases access to print or otherwise manufacture an orthodontic appliance based on the data file once (or other specified number of times).

Dependent upon the embodiment, the control circuit 1102 transmits the data file to the user device 1110, the manufacturing device 1118, or a third-party device (e.g., a laboratory capable of manufacturing the orthodontic appliance for the user). To whom, or to what device, the data file is transmitted may also aid in achieving access control. For example, in one embodiment, the control circuit 1102 transmits the data file directly to the manufacturing device 1118. Because the data file is not transmitted to the user device 1110, the data file may not be easily accessible by the user device 1110. Further, if an entity that controls the control circuit 1102 controls the manufacturing device 1118, access may to files received by the manufacturing device 1118 may be further limited. In some embodiments, the control circuit 1102 transmits the data files to the user device 1110. In such embodiments, the user device 1110 transmits, via the communications radio (e.g., over a universal serial bus (USB) connection, wireless connection based on the 802.11 standard, etc.), the data files to the manufacturing device 1118.

The manufacturing device 1118 additively manufacturers the orthodontic appliance(s) and/or orthodontic system based on the data file. The manufacturing device 1118 can be of any suitable type, such as a 3D printer. The manufacturing device 1118 can be local to, or remote from, one or more of the control circuit 1102 and the user device 1110. For example, in one embodiment, the user device 1110 and the manufacturing device 1118 are located in the user's office (i.e., the user device 1110 and the manufacturing device 1118 are local to one another). Alternatively, the manufacturing device 1118 may be located in a laboratory or some other facility that manufactures orthodontic appliances for the user.

Figure 12:
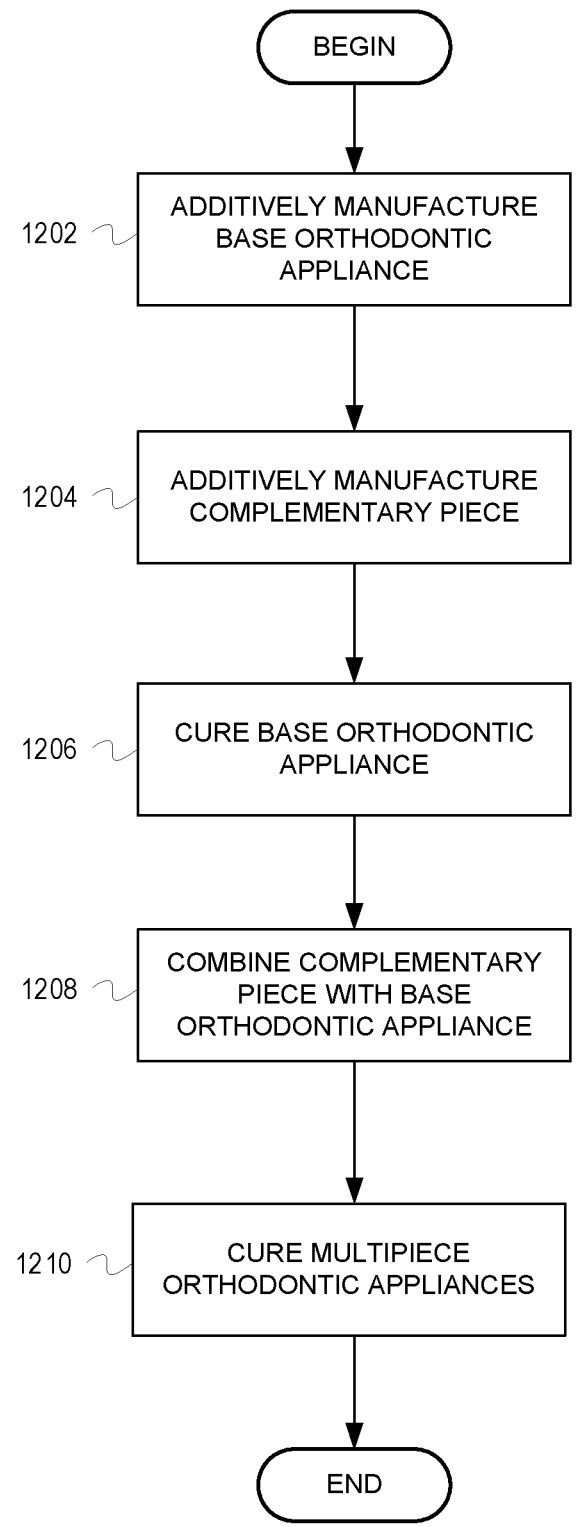
FIG. 12 is a flow chart depicting example operations for assembling multipiece orthodontic appliances, according to some embodiments.

While the discussion of FIG. 11 provides additional detail regarding the manufacture of orthodontic systems, the discussion of FIG. 12 describes example operations for assembling multipiece orthodontic appliances.

FIG. 12 is a flow chart depicting example operations for assembling multipiece orthodontic appliances, according to some embodiments. The flow begins at block 1202.

At block 1202, a base orthodontic appliance is additively manufactured. For example, a manufacturing device can additively manufacture the base orthodontic appliance based on a data file. The base orthodontic appliance is part of a multipiece orthodontic appliance. In one embodiment, the base orthodontic appliance is the orthodontic appliance described herein. Additionally, in some embodiments, the additive manufacture of the base orthodontic appliance can include the additive manufacture of other components, such as a carrier structure and support structures, though such is not required. In such embodiments, the carrier structure, including the base orthodontic appliance and support structures, can be additively manufactured as a single, or multiple, structures. Additionally, the manufacture of the base orthodontic appliance can include the additive manufacture of multiple base orthodontic appliances. The flow continues at block 1204.

At block 1204, a complementary piece is additively manufactured. For example, the manufacturing device can additively manufacture the complementary piece based on a data file. The complementary pieces are part of the multipiece orthodontic appliance. For example, the base orthodontic appliance and complementary piece can be combined to form the multipiece orthodontic appliance. It should be noted however, that the multipiece orthodontic appliance may include more than two parts (i.e., components in addition to the base orthodontic appliance and the complementary pieces). In some embodiments, the additive manufacture of the complementary pieces can include the additive manufacture of other components, such as an assembly structure and support structures, though such is not required. In such embodiments, the assembly structure, including the complementary pieces and support structures, can be additively manufactured as a single, or multiple, structures. Additionally, the manufacture of the complementary piece can include the additive manufacture of multiple complementary pieces. The flow continues at block 1206.

At block 1206, the base orthodontic appliance is cured. For example, the base orthodontic appliance can be cured by subjecting the base orthodontic appliance to suitable conditions. The suitable conditions can include, for example, exposure to one or more of light (e.g., ultraviolet light), temperature (e.g., a temperature above or below a certain value), air (e.g., ambient air, gasses of a specific chemical composition, etc.), a curing agent, etc. Additionally, curing the base orthodontic appliance may also require exposure for a certain period of time. Curing the base orthodontic appliance can include fully, or partially, curing the base orthodontic appliance, dependent upon the embodiment and desired properties of the base orthodontic appliance relative to the complementary piece. For example, curing the base orthodontic appliance may cause the base orthodontic appliance to become more rigid, harder, etc., and a desired rigidity, hardness, etc. of the base orthodontic appliance can be achieved based on the degree to which the base orthodontic appliance is cured. In embodiments in which multiple base orthodontic appliances are additively manufactured, one or more of the multiple base orthodontic appliances can be cured at this step. The flow continues at block 1208.

At block 1208, the complementary piece is combined with the base orthodontic appliance. For example, the complementary piece can be combined with the base orthodontic appliance by securing the complementary piece to the base orthodontic appliance via physical engagement between mating mechanisms of the complimentary piece and the base orthodontic appliance. Such operations can be performed with only the complementary piece and the base orthodontic appliance or with an orthodontic system, for example including a carrier structure and an assembly structure, of which the base orthodontic appliance and complementary piece are a part. In one embodiment, the complementary piece has not yet been cured (i.e., not fully cured), though the base orthodontic appliance has been cured (i.e., cured to a desired state), when the complementary piece is combined with the base orthodontic appliance. This difference in the state of curing of the base orthodontic appliance and the complementary piece results in a differing rigidity, hardness, etc. of the base orthodontic appliance as compared to the complementary piece. In such embodiments, the combination of the complementary piece with the base orthodontic appliance may be facilitated by deformation, temporary and/or permanent, of the complementary piece. In embodiments in which multiple base orthodontic appliances and complementary pieces are additively manufactured, the multiple complementary pieces can be combined with the multiple base orthodontic appliances at this step. It should be noted that although the base orthodontic is described herein as being cured before the complementary piece, such is not required. For example, in some embodiments, similar results can be achieved by curing the complementary piece, and not the base orthodontic appliance, before combining the complementary piece and the base orthodontic appliance. The flow continues at block 1210.

At block 1210, the multipiece orthodontic appliance is cured. For example, the multipiece orthodontic appliance can be cured by subjecting the multipiece orthodontic appliance to suitable conditions. The suitable conditions can include, for example, exposure to one or more of light (e.g., ultraviolet light), temperature (e.g., a temperature above or below a certain value), air (e.g., ambient air, gasses of a specific chemical composition, etc.), a curing agent, etc. as well as an amount of time that the multipiece orthodontic appliance is subjected to the conditions.

In some embodiments, an orthodontic system comprises a carrier structure comprising a base, a plurality of groups of support structures, a plurality of orthodontic appliances, wherein each of the plurality of orthodontic appliances is associated with one of the plurality of groups of support structures, and wherein the plurality of groups of support structures secure the plurality of orthodontic appliances to the base, and at least one rail extending from the base, and an assembly structure comprising a body, a plurality of complementary pieces, wherein each of the complementary pieces is associated with one of the plurality of orthodontic appliances, and wherein the plurality of complementary pieces are secured to the body, at least one channel, wherein the at least one channel is configured to interface with the at least one rail to allow the assembly structure to be moved from a first position to a second position with respect to the carrier structure, wherein movement of the assembly structure with respect to the carrier structure causes the plurality of complementary pieces to mate with the plurality of orthodontic appliances.

In some embodiments, a method for assembling multipiece orthodontic appliances comprises additively manufacturing base orthodontic appliances, additively manufacturing complementary pieces, wherein each of the complementary pieces is associated with one of the base orthodontic appliances, curing the base orthodontic appliances, combining the complementary pieces with the base orthodontic appliances to form the multipiece orthodontic appliances, wherein the combining the complementary pieces with the base orthodontic appliances causes the complementary pieces to at least temporarily deform, and curing the multipiece orthodontic appliances.

In some embodiments, system for additively manufacturing multipiece orthodontic appliances comprises a database storing data files associated with the multipiece orthodontic appliances and a control circuit, wherein the control circuit is configured to receive, from a user device, an indication of the multipiece orthodontic appliances, retrieve, from the database, one of the data files, wherein the one of the data files is associated with the multipiece orthodontic appliances, wherein the one of the data files includes instruction to additively manufacture a carrier structure and an assembly structure, wherein the carrier structure includes base orthodontic appliances secured to the carrier structure via groups of support structurers, wherein the assembly device includes a plurality of complementary pieces each associated with one of the base orthodontic appliances, wherein the carrier structure comprises a first mating element and the assembly structure comprises a second mating element, wherein the first mating element and the second mating element are configured to allow the assembly structure to move with respect to the carrier structure from a first position to a second position, wherein movement of the assembly structure with respect to the carrier structure causes the plurality of complementary pieces to mate with the plurality of orthodontic appliances to form the multipiece orthodontic appliances, and transmit, via a communications network for additive manufacture of the carrier structure and the assembly structure, the data files.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An orthodontic system, the orthodontic system comprising:
   a carrier structure comprising:
      a base;
      a plurality of groups of support structures;
      a plurality of orthodontic appliances, wherein each of the plurality of orthodontic appliances is associated with one of the plurality of groups of support structures, and wherein the plurality of groups of support structures secure the plurality of orthodontic appliances to the base; and
      at least one rail extending from the base, wherein the at least one rail extends linearly from a first end of the orthodontic system to a second end of the orthodontic system; and
   an assembly structure comprising:
      a body;
      a plurality of complementary pieces, wherein each of the complementary pieces is associated with one of the plurality of orthodontic appliances, wherein the plurality of complementary pieces are secured to the body;
      at least one channel, wherein the at least one channel is configured to interface with the at least one rail to allow the assembly structure to be moved linearly from a first position proximate to the first end of the orthodontic system to a second position proximate to the second end of the orthodontic system with respect to the carrier structure;
   wherein movement of the assembly structure with respect to the carrier structure causes the plurality of complementary pieces to mate with the plurality of orthodontic appliances.

2. The orthodontic system of claim 1, wherein the plurality of complementary pieces mate with the plurality of orthodontic appliances as the assembly structure is moved from the first position to the second position.

3. The orthodontic system of claim 1, wherein the assembly structure is configured to move with respect to the carrier structure when in the second position to cause the plurality of complementary pieces to mate with the plurality of orthodontic appliances.

4. The orthodontic system of claim 3, wherein the assembly structure moves with respect to the carrier structure when in the second position by rotating with respect to the carrier structure.

5. The orthodontic system of claim 1, wherein a first portion of the plurality of orthodontic appliances are located on a first side of the rail and a second portion of the plurality of orthodontic appliances are located on a second side of the rail, and wherein a first portion of the plurality of complementary pieces are located on a first side of the channel and a second portion of the plurality of complementary pieces are located on a second side of the channel.

6. The orthodontic system of claim 5, wherein the carrier structure is cured before the plurality complementary pieces mate with the plurality of orthodontic appliances.

7. The orthodontic system of claim 6, wherein the plurality of orthodontic appliances and the complimentary pieces are cured after the complementary pieces mate with the plurality of orthodontic appliances.

8. The orthodontic system of claim 1, wherein the at least one rail includes a mating structure and wherein the at least one channel includes a corresponding mating structure.

9. The orthodontic system of claim 8, wherein the mating structure and the corresponding mating structure are specific to one or more of the plurality of orthodontic appliances and the plurality of complementary pieces.

* * * * *